H. W. HAYDEN.
Lamp Burner.

No. 106,363.

Patented Aug. 16, 1870.

WITNESSES:
Chas H. Smith
Geo T Pinckney

INVENTOR:
Hiram W. Hayden
Lemuel W. Serrell atty

United States Patent Office.

HIRAM W. HAYDEN, OF WATERBURY, CONNECTICUT, ASSIGNOR TO HOLMES, BOOTH & HAYDENS, OF SAME PLACE.

Letters Patent No. 106,363, dated August 16, 1870.

IMPROVEMENT IN LAMP-BURNERS.

The Schedule referred to in these Letters Patent and making part of the same

*To all whom it may concern:*

Be it known that I, HIRAM W. HAYDEN, of Waterbury, in the county of New Haven and State of Connecticut, have invented, and made an Improvement in Lamp-Burners; and the following is declared to be a correct description thereof.

Before this invention, a lamp-burner had been made with a circular wick-tube and an interior air-tube, the two being connected on one side, and the wick passing at each side of this connection, so as to form an Argand lamp. This character of lamp may be seen in Webster & Park's Encyclopedia of Domestic Economy, page 190.

This invention of mine is intended to facilitate the construction of the burner, lessen its expense, and insure the raising and lowering of the wick with uniformity.

I make use of a tapering exterior wick-tube and a nearly cylindrical interior air-tube, and provide an opening for the lateral admission of air to the air-tube, and I provide a wick-holder and slide, operated by a rack and wheel, so as to raise or lower the wick with accuracy, and a movable chimney-holder is provided around the wick-tube, and above a perforated air-distributer.

By this construction the wick can be entered with facility between the tubes, when the wick-holder is moved to the upper end of the wick-tube, and the wick is drawn through a suitable distance, so that, when the wick and raiser are drawn down by the actuating-wheel, the top of the wick can be trimmed, and raised or lowered, to regulate the light; and, as the length of wick is burnt up, the same can be drawn further out from the holder until the wick is consumed.

In the drawing—

*a* is the exterior wick-tube, of a circular but slightly tapering form, and connected to the same is the screw or ring *b*, by which the burner is to be attached to the reservoir.

*c* is a perforated or foraminous air-distributer, of suitable size and shape, surrounding the tube *a*, and upon which the chimney-holder *d* rests or is attached.

Within the tube *a* is the central air-tube *e*, that is of a cylindrical form, so that there will be a proper space left at the upper ends of the tubes *a* and *e*, for the wick, which wick is of a flat form, bent into a cylinder at the upper end of the burner, to produce an Argand flame.

The interior draught is admitted laterally into the air-tube *e* by an opening and tubular connection, at *f*, between the tubes *a* and *e*.

The wick-holder *i* is made as a band, partially or entirely surrounding the wick, with projecting points, to penetrate the wick, and connect therewith; and from one side of this wick-holder *i* a rack-bar, *l*, passes down inside the tube *a*, to the wheel *h*, so as to form a rack and pinion to operate the wick-holder. I find that a convenient way of making this rack and pinion is to provide a row of holes in the rack, and use pointed pinion-teeth.

The rack is to be guided by passing through a slide, *m*.

A thumb-wheel, *k*, upon the shaft of the pinion *h*, is employed for actuating the same.

It will now be understood that, when the wick-holder is moved to the top of the burner, the wick can be slipped or pushed up from below, and drawn evenly through within this holder *i* the proper distance, and that this holder will operate to lower or raise the wick with uniformity, and, when consumed down to the wick-holder, the wick can be drawn through another length, as before. By this means the wick will be operated more uniformly than with the screw wick-raiser heretofore used on Argand lamps.

The chimney-holder is shown as formed of a range of clamping-springs, *n*, connected with a tapering perforated guide, *o*, that surrounds the wick-tube *a*, and is within the chimney *t*, so that the holder, chimney, and guide *o* can be lifted off the burner to give access to the wick, and, when the chimney-holder and guide are in place, the air, passing through the distributer *c*, is divided, a portion going into the air-tube *e*, and the remainder passing through holes in guide *o*, to supply the external draught to the flame.

I claim as my invention—

Figure 1:
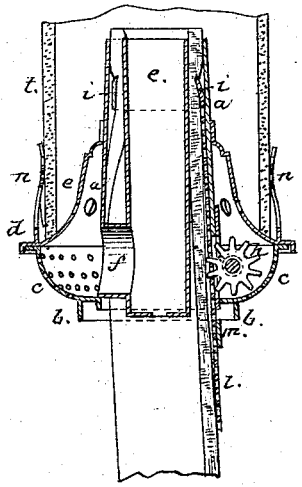
Figure 1 is a vertical section of my improved burner.
Figure 2:
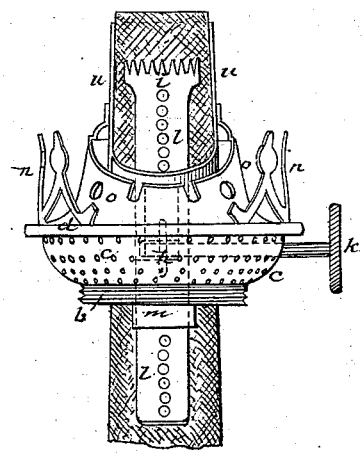
Figure 2 is a similar view at right angles to fig. 1.

1. The wick-tube *a*, interior air-tube *e*, and lateral connection *f*, in combination with the wick-holder *i*, rack-bar *l*, and wheel *h*, substantially as and for the purposes set forth.

2. The tapering perforated guide *o* and spring chimney-holder *n*, constructed substantially as specified, and combined with the foraminous air-distributer *e*, that supports the removable spring chimney-holder and guide when in place, substantially as set forth.

Signed by me this 25th day of June, A. D. 1870.

H. W. HAYDEN.

Witnesses:
 GEORGE H. COWELL,
 JOHN O'NEIL, Jr.